United States Patent [19]
Knapp

[11] Patent Number: 6,131,611
[45] Date of Patent: Oct. 17, 2000

[54] CARTRIDGE OR MECHANISM FOR A SEQUENTIAL MIXING VALVE

[76] Inventor: Francesco Knapp, Via Giacomo Leopardi 28, I-27061 Cava Manara, Italy

[21] Appl. No.: 09/207,423

[22] Filed: Dec. 8, 1998

[30] Foreign Application Priority Data

Dec. 15, 1997 [IT] Italy .................................. TO97A1088

[51] Int. Cl.⁷ .................................................... F16L 5/00
[52] U.S. Cl. ............................... 137/614.17; 137/625.41; 251/121
[58] Field of Search .......................... 137/625.17, 625.41, 137/614.16, 614.17; 251/121

[56] References Cited

U.S. PATENT DOCUMENTS

| | | | |
|---|---|---|---|
| 3,520,327 | 7/1970 | Claydon et al. ................... | 137/614.17 |
| 3,623,510 | 11/1971 | Hare et al. ......................... | 137/614.17 |
| 4,064,908 | 12/1977 | Loe .................................... | 137/614.17 |
| 4,088,153 | 5/1978 | Passikivi ............................ | 137/625.17 |
| 4,823,841 | 4/1989 | Graber ............................... | 137/614.17 |
| 5,100,565 | 3/1992 | Fujiwara et al. ................... | 137/625.17 |

FOREIGN PATENT DOCUMENTS

| | | |
|---|---|---|
| 0 063 627 | 11/1982 | European Pat. Off. . |
| 0 653 581 | 5/1995 | European Pat. Off. . |
| 28 03 663 | 8/1979 | Germany . |

*Primary Examiner*—A. Michael Chambers
*Attorney, Agent, or Firm*—Young & Thompson

[57] ABSTRACT

A cartridge for a mixing valve of the so-called sequential type, which includes:—an envelope intended for being inserted in a valve body;—a bottom member which closes at bottom the envelope, has outer connections intended to sealingly cooperate with passageways for inlet of hot and cold water, present in the valve body, and has an inner seat for sealingly receiving a fixed hard material control plate;—and a rotationally movable member arranged for internally housing a movable hard material control plate and having a portion intended for protruding out of the valve body with a device for receiving a maneuver member; wherein the fixed control plate has a pair of passageways situated near its periphery for the inlet of cold and hot water, and a substantially central passageway for the outlet of mixed water, the movable control plate has an inlet passageway situated near its periphery and a central outlet passageway, and the movable plate is sealingly installed in said movable member in such a way as to delimit with the same a closed space, communicating with the outside substantially only through the passageways of the movable control plate. Instead of in the shape of a cartridge, the mechanism may be directly assembled in a valve body.

13 Claims, 2 Drawing Sheets

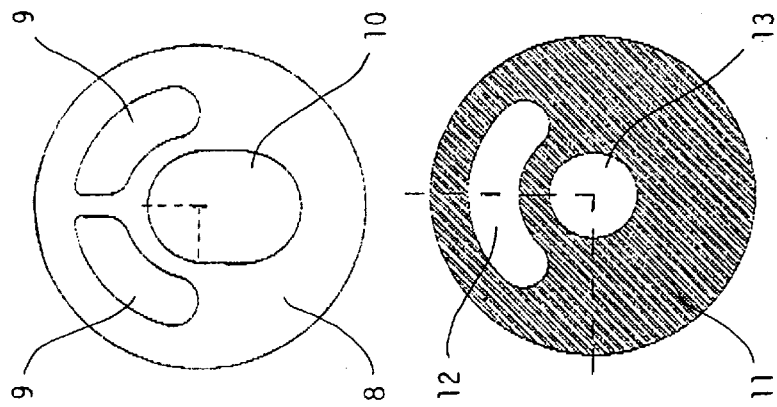
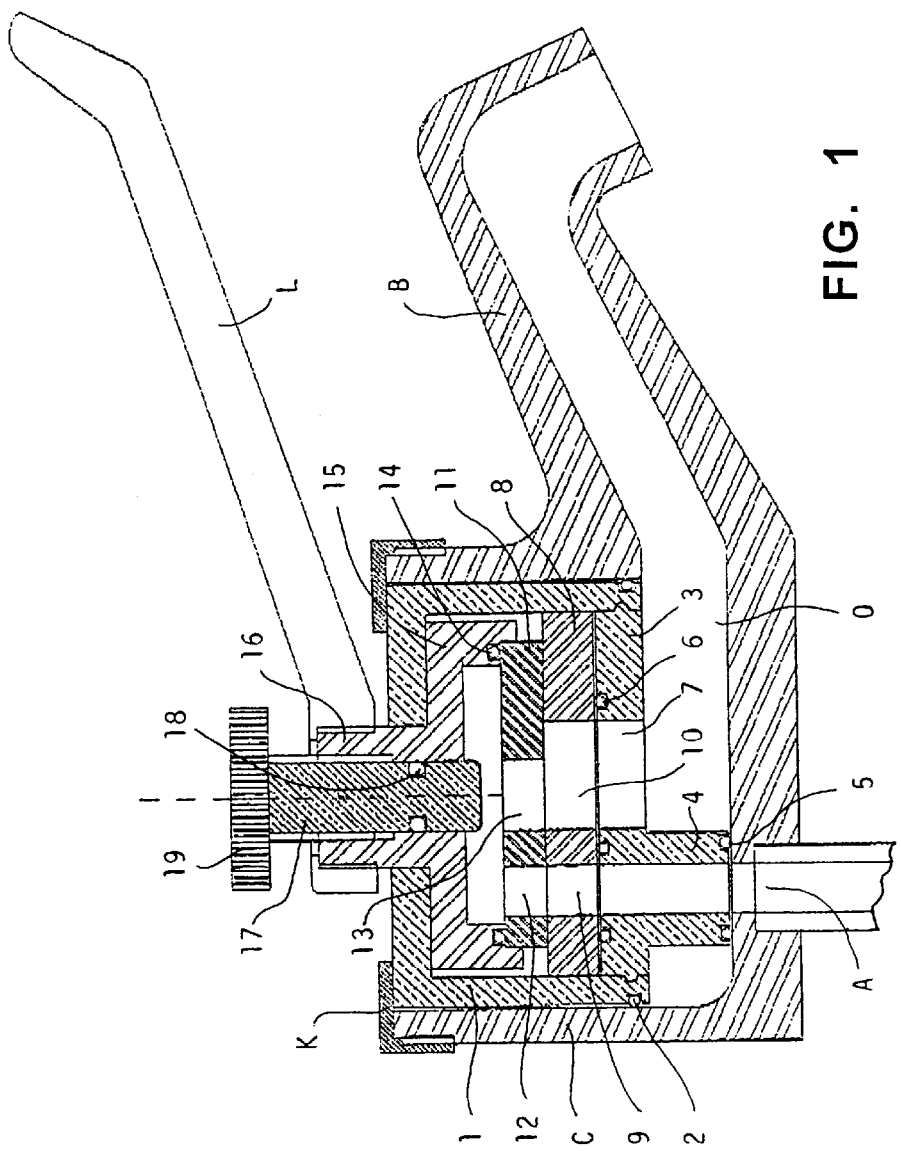

CARTRIDGE OR MECHANISM FOR A SEQUENTIAL MIXING VALVE

BACKGROUND OF THE INVENTION

1. Field of the Invention

This invention refers to a mechanism, which may possibly be embodied in the form of a cartridge, for a mixing valve of the so-called sequential type.

2. Description of the Prior Art

The so-called "sequential" mixing valves are those in which a single control member is movable with a sole degree of freedom and, during a complete stroke, starting from a rest position in which the delivery is shut off, during a first stage allow delivering only cold water, whose delivery rate increases up to a pre-established maximum, then during a second stage (stage of mixing) they effect the mixing of hot water in an increasing ratio with respect to the cold water, up to delivering only hot water, and finally in a third possible stage (which however may be missing) they reduce the delivery rate of the hot water.

These sequential mixing valves have the advantage of requiring, for the operation of regulating the flow, only the displacement, in the opposite ways of the same direction, of the single control member, which may be a long lever. As a consequence, their control is very easy and it may be effected without difficulty by disable persons too. For this reason the sequential mixing valves are preferred in the public houses, and according to some regulations they are made compulsory, whereby in certain cases there is the need of replacing the sequential mixing valves for the pre-existing installed single lever mixing valves. In view of the embodiments known up to-day of the sequential mixing valves, in those cases it was necessary to materially replace the whole valve, thus incurring a noticeable cost, because there was no possibility of operating an adjustment thereof to the regulations. Moreover, the known sequential mixing valves have relatively complicated and cumbersome structures, and in any event they do not allow to regulate the maximum delivery rate allowed, as it is often required. This may be done only by using separate control valves inserted upstream or downstream the sequential mixing valve. In the manufacture of such known sequential valves, no important part may be used, that is used for the manufacture of single lever mixing valves too. Thus, no standardization is possible in the manufacture of both types of valves.

A sequential mixing valve may be embodied in the shape of a cartridge intended to be housed in a valve body, or its mechanism may be directly assembled in a valve body.

SUMMARY OF THE INVENTION

A first object of this invention is of providing a cartridge or mechanism for a sequential mixing valve having a structure very simple, stood and cheap. Another object of the invention is of providing a cartridge or mechanism for a sequential mixing valve wherein the fixed hard material control plate may be identical to an existing fixed hard material control plate, used in the manufacture of single lever mixing valves, thus allowing to reduce the manufacturing costs. A further object of the invention is of allowing, in economically and industrially profitable conditions, the insertion into the sequential mixing valve itself of means for regulating the maximum delivery rate allowed. Finally, it is an object of the invention of rendering possible the provision of a cartridge of the sequential type which may be installed in the body of an existing single lever mixing valve in order to convert the same to a sequential operation, thus allowing not only an important standardization in the manufacture, but also the possibility of easily converting to the sequential operation, at a minimum cost, an already installed valve of the single lever type.

The first object of the invention is attained by means of a mechanism for a sequential mixing valve which has a seat for sealingly receiving a fixed hard material control plate, and includes a rotationally movable member arranged for internally housing a movable hard material control plate and having a portion intended for protruding out of the valve body with means for receiving a maneuver member, characterized: in that said fixed control plate has a pair of passageways situated near its periphery for the inlet of cold and hot water, and a substantially central passageway for the outlet of mixed water; in that said movable control plate has an inlet passageway situated near its periphery and a central outlet passageway; and that said movable plate is installed in said movable member in such a way as to delimit with the same a closed space, communicating with the outside substantially only through the passageways of the movable control plate.

In the constructional embodiment, each one or some of said passageways may be composed of two or more adjacent openings.

Such a mechanism has a very simple and cheap structure which may be easily manufactured. Moreover this mechanism may be embodied with a very limited height, in those cases in which this is desirable.

An important development made possible by the described structure consists in that the fixed control plate may be identical to a fixed control plate usually manufactured for use in the single lever mixing valves. It ensues that there is avoided the need for manufacturing fixed control plates especially designed for use in the sequential mixing valve, with a considerable economical advantage.

The mechanism according to the invention may be embodied in the form of a cartridge having an envelope intended to be housed in the body of a valve, and having a bottom member which closes said envelope and has at the outer side connections intended for sealingly cooperating with inlet passageways for cold and hot water, existing in the valve body.

Such a cartridge allows reducing to a minimum the number of seal packings, because neither the bottom member, nor the movable member (if this latter is sealingly coupled with the movable control plate) require a hydraulic sealing with respect to the cartridge envelope.

However, the necessary sealing towards the outside, both in a cartridge and in a mechanism directly assembled into a valve body, may be obtained in different ways.

Although the sequential cartridge, as already said, may be designed with an extremely reduced height, to this advantage one may chose to renounce in order to give to the sequential cartridge a shape and outer size identical to those of a cartridge intended for a single lever mixing valve. This way, during the manufacture of sequential valves it is possible to employ valve bodies designed for single lever mixing valves, by simply inserting therein a cartridge according to this invention instead of the usual single lever cartridge. This allows obtaining important reductions in the manufacture costs.

An important consequence of the provision of a sequential cartridge having shape and outer size identical to those of a cartridge intended for a single lever mixing valve resides in that, when there is the need for converting a single lever mixing installation in a sequential mixing installation, instead of replacing the entire valve it is sufficient to replace a sequential cartridge for the original single lever cartridge, through an extremely easy operation and incurring a cost reduced to the simple purchase of a sequential cartridge and, if needed, of a replacement cover for the valve.

Moreover, into the mechanism according to the invention it is possible to integrate a member having the shape of a piston, axially mounted in the movable member in front of the central outlet passageway of the movable control plate and displaceable towards and out of this passageway. In this manner it is easy to regulate the free section of the outlet passageway, and therefore the maximum delivery rate allowed for the valve. Said member having the shape of a piston may be simply sealingly screwed in the portion of the movable member which is intended to protrude from the valve body, in such a way as to be open to regulation from the outside.

In particular, said member in the shape of a piston may end at the outside with a control knob, which may either be offered to the maneuver of the user, or may be hidden by a small cover for being normally excluded from the maneuver of the user.

BRIEF DESCRIPTION OF THE DRAWINGS

These and other features, objects and advantages of the subject of this invention will more clearly appear from the following description of two embodiments, having the character of non-limitative examples, with reference to the appended drawings, wherein:

FIG. 1 shows in an axial section a first embodiment of a sequential cartridge according to the invention, installed in a valve body especially designed for this cartridge;

FIG. 2 shows in a frontal view the fixed control plate employed in the cartridge according to FIG. 1;

FIG. 3 shows in a frontal view the movable control plate employed in the cartridge according to FIG. 1.

DESCRIPTION OF THE PREFERRED EMBODIMENTS

Figure 4:
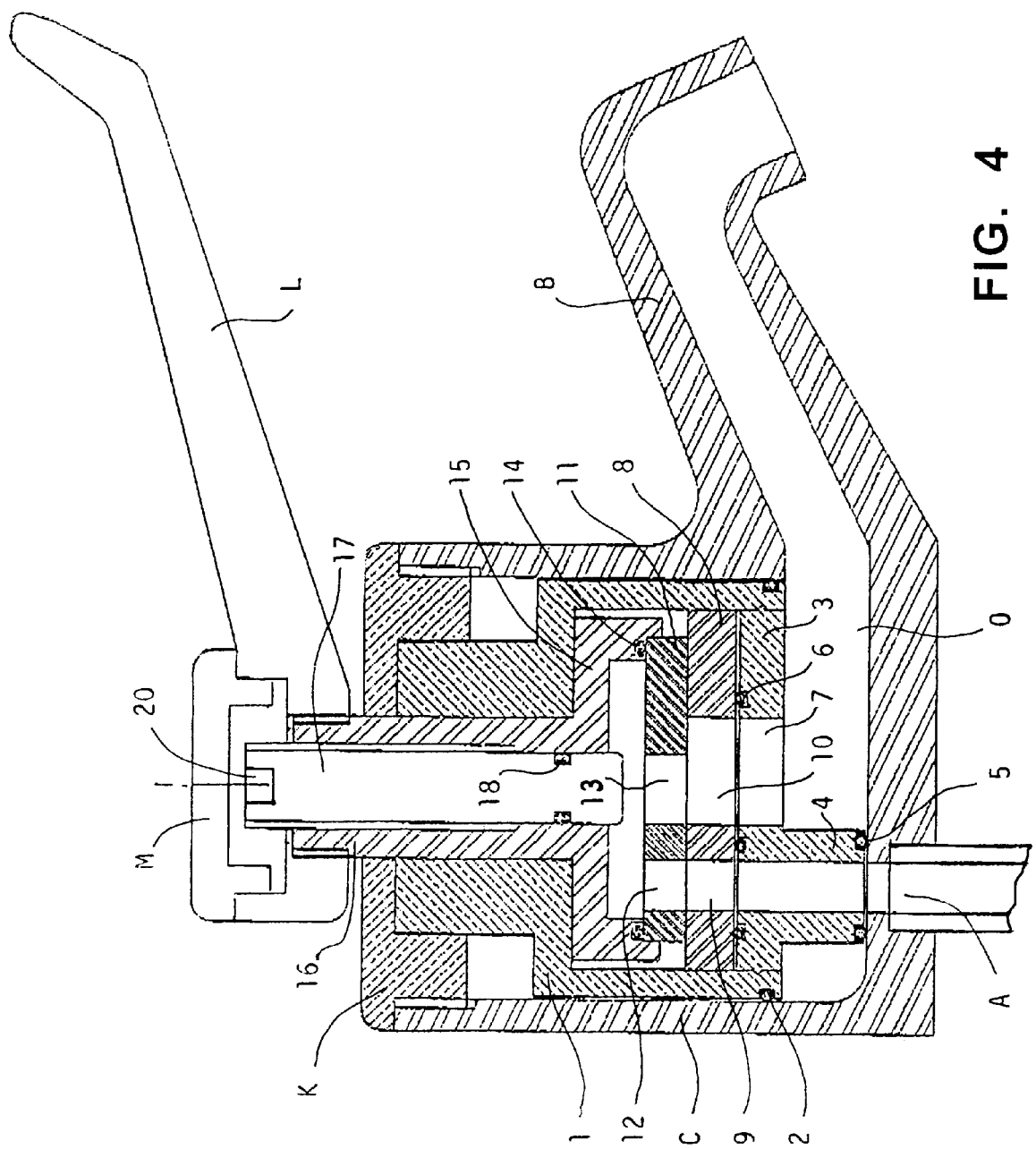
FIG. 4 shows, similarly to FIG. 1, a second embodiment of a cartridge according to the invention, installed in a valve body originally designed for receiving a single lever mixer cartridge.

The embodiments shown as examples refer to the manufacture of the sequential mechanism in the shape of a cartridge, but those skilled in the art will clearly understand how the same mechanisms may be directly assembled into a valve body instead of in a cartridge.

Making reference to FIG. 1, there is shown a valve body C which extends to form a delivery spout B and in whose interior there is a chamber O wherein is intended to be installed a cartridge, which is then kept in position by an annular cover K. The body C has two inlet connections A for the intake of hot and cold water, only one of which may be seen in FIG. 1.

The cartridge according to the invention has an envelope I designed for being inserted into the chamber O of body C by sealing therein with a packing 2. The envelope 1 is closed at the bottom end by a bottom member 3 which may be connected to the envelope I in any manner, for example by means of elastic release, and which is not required to hydraulically seal with respect to the envelope 1. The bottom member 3 has two protruding tubular sleeves 4 provided with packings 5 (only one of which may be seen in the figure) which are intended to seal with respect to the inlet connections A of the valve body C. Opposite the sleeves 4, the bottom member 3 forms a seat for receiving a fixed control plate 8, and to this purpose it carries a suitable multiple packing, or a number of packings, 6. Centrally the bottom member has an opening 7 which opens into the chamber O of the valve body C.

The fixed control plate 8, whose plan view is shown in FIG. 2, has two inlet passageways 9 in the shape of curved slots, which extend along a portion of its periphery, and a substantially central outlet passageway 10. The inlet passageways 9 are intended to register with the hollow of the tubular sleeves 4 in order to receive the supply of hot and cold water coming from the connections A of the valve body C, and the outlet passageway 10 is intended to register with the opening 7 of the bottom member 3 in order to forward the mixed water towards the chamber O of body C and therefrom to the delivery spout B.

It is to be remarked that the fixed control plate 8 may be identical at all to a usual fixed control plate intended for the cartridge of a single lever mixing valve. It is possible, therefore, to completely standardize the manufacture of this part, between the cartridges intended for the single lever mixing valves and the cartridges intended for the sequential valves, thus enjoying the consequent advantages in economy, manufacture and storage. However, should these advantages not be of interest, the fixed control plate 8 could also be especially designed.

Onto the fixed control plate 8 there is mounted a movable control plate 11. The movable control plate 11, whose plan view is shown in FIG. 3, has an inlet passageway 12 in the shape of a curved slot which extends along a part of its periphery, and a central outlet passageway 13. The inlet passageway 12 is so arranged that in different angular positions of the movable control plate 11 it may more or less register with the one, the other or both the inlet passageways 9 of the fixed control plate 8, whereas the central outlet passageway 13 registers with the outlet passageway 10 of the fixed control plate 8.

The movable control plate 11 is mounted, by sealing thanks to a packing 14, in a movable member 15 which on its turn is rotatably mounted, without the need of sealing, within the cartridge envelope 1. The movable member 15 extends to form a neck 16 which projects out of the cartridge and the valve cover K in order to receive a maneuver member, which may be for example a lever L, intended to be displaced in rotation along an arc, limited for example by stops not shown.

By rotating, by means of lever L, the movable control plate 11 with respect to the fixed control plate 8, the inlet passageway 12 of the movable control plate 11 may be put in a position in which it does not register with any of the inlet passageways 9 of the fixed control plate 8, thus obtaining a position of cut off. Starting from this position, and continuing the rotation of the movable control plate 11, during a first stage the inlet passageway 12 of the movable control plate 11 registers, with a regularly increasing passage section, with the inlet passageway 9 for cold water of the fixed control plate 8, thus obtaining the delivery of an increasing rate of cold water, then the inlet passageway 12 of the movable control plate 11 comes to register, with a regularly increasing passage section, to the inlet passageway 9 for hot water of the fixed control plate 8, whereas the passage section registering with the inlet passageway 9 for cold water of the fixed control plate 8 regularly decreases, thus obtaining a gradually increasing mixing of hot water to the cold water, up to the delivery of hot water only. Finally, if this is required, a regular decrease of the delivery rate of hot water may be provided. In all positions, the hot and cold water entered into the movable member 15 through the passageways 9 and 12 mix together inside the movable member, and then they come out therefrom through the passageways 13 and 10 and, through the opening 7, they reach the chamber O and the delivery spout B.

Although in the described example the movable control plate 8 is sealingly connected to the movable member 15 by means of a packing, it is possible to obtain the seal towards the outside by omitting the said packing and mounting a packing in another location, for example between the movable member 15 and the cartridge envelope 1 or the valve body C.

As it may be understood from the above description, and as it may be observed from FIG. 1, thanks to its structure the cartridge may be designed with a reduced encumbrance in height, and therefore the valve body C too, if it is especially designed for this cartridge (or if the mechanism is directly assembled therein), may have a reduced encumbrance in height.

Nevertheless, this advantage may be given up and the cartridge may be given a greater height in order to give it a shape and outer size identical to those of a usual cartridge for a single lever mixing valve. This is shown in FIG. 4, wherein the parts corresponding to the already described ones are designated by the same numbers and will no more be described. In this case, the valve body C is identical to the body of a usual single lever valve, and may be standardized therewith in the manufacture, Moreover it becomes possible to convert a single lever valve, even if already installed, in a sequential valve, by simply replacing a sequential cartridge according to the invention for the original single lever cartridge of that valve. If needed, the cover K will be replaced too.

The central position of the outlet passageway 13 of the movable control plate 11 allows inserting into the cartridge, in a simple way, a means for regulating the maximum delivery rate allowed. To this aim, a central piston 17 is inserted, sealing by means of a packing 18, in the neck 16 of the movable member 15, and it is screwed in the same, whereby by rotating the piston it is possible to, regulate the distance between the inner end of piston 17 and the outlet passageway 13 of the movable control plate 11. In this manner, the free section offered to the delivered mixed water may be controlled, and hence the maximum delivery rate allowed may be limited, as in many cases is desired.

The maneuver of piston 17 may be put at disposal of the user, as shown in FIG. 1, by providing the piston 17 with an outer control knob 19. If, on the contrary, it is not desired that the user may effect this regulation, the piston 17 may be provided with a maneuver member 20, such as for example a slot for a screwdriver, or a hexagonal cavity, which may be operated only with a suitable tool, and it may be normally covered by a small cover M applied onto the lever L as shown by FIG. 4.

It should be understood that the invention is not limited to the embodiments described and shown as examples. Several changes will be evident to those skilled in the art. For example, the shape of the fixed control plate 8 may be made equal to any one of the different fixed control plates which are known for the single lever mixing valves, or even it may be especially designed. The length of the inlet passageway 12 of the movable control plate 11 may vary according to the control characteristics to be imparted to the cartridge. The shape and outer size of the cartridge may correspond to any of the various known cartridges for single lever valves, particularly in what concerns the arrangement of the sleeves 4 (or other connection means) intended to cooperate with the inlet connections A of the valve body C. Also the opening 4 of the bottom member 3 may, if needed, be provided with a packing in order to cooperate with a delivery connection of the valve body, instead of opening in a chamber O communicating with a delivery spout B. Moreover, as already said, the mechanism may be directly assembled in a valve body, instead of forming a cartridge, and each one or some of the passageways described may be formed, in the manufacture, by two or more adjacent openings.

These and other changes and every replacement by technically equivalent means may be made to what has been described and represented, without departing from the scope of this patent, as set forth in the appended Claims.

What is claimed is:

1. A mechanism for a mixing valve of the so-called sequential type having a valve body, which mechanism comprises a bottom member, a seat in said bottom member, a fixed hard material planar control plate sealingly received in said seat, a rotationally movable member, a movable hard material planar control plate housed internally to said movable member, said movable member having a portion intended for protruding out of said valve body and having means for receiving a maneuver member, wherein:—said fixed planar control plate has a pair of passageways situated near its periphery for the inlet of cold and hot water, and a substantially central passageway for the outlet of mixed water;—said movable planar control plate has an inlet passageway situated near its periphery and a central outlet passageway; and said movable planar plate is installed in said movable member in such a way as to delimit with the same a closed space, communicating with the outside substantially only through said passageways of the movable planar control plate.

2. A mechanism as set forth in claim 1, in which at least one of said passageways is composed of two or more adjacent openings.

3. A mechanism as set forth in claim 1, wherein said fixed player control plate is identical to any fixed control plate usually manufactured for use in the single lever mixing valves.

4. A mechanism as set forth in claim 1, which has the form of a cartridge having an envelope intended to be housed in a valve body having inlet passageways for cold and hot water, said cartridge having a bottom member which closes said envelope and has at the outer side connections intended for sealingly cooperating with said inlet passageways existing in the valve body.

5. A cartridge as set forth in claim 4, wherein said bottom member has no packing for the hydraulic sealing with respect to the cartridge envelope.

6. A cartridge as set forth in claim 4, which has a shape and outer size identical to those of a cartridge intended for a single lever mixing valve, in order that it may be interchanged therefor.

7. A mechanism as set forth in claim 1, wherein said movable member is sealingly coupled with said movable control plate and has no packing for the hydraulic sealing with respect to the valve body or a cartridge envelope.

8. A mechanism as set forth in claim 1, wherein its structure is designed with a very reduced height.

9. A mechanism as set forth in claim 1, which includes a member having the shape of a piston, axially mounted in said movable member in front of the central outlet passageway of said movable control plate and displaceable towards and out of this passageway in order to regulate the free section of the outlet passageway and therefore the maximum delivery rate allowed for the valve.

10. A mechanism as set forth in claim 9, wherein said member in the shape of a piston is sealingly screwed in said portion of the movable member which is intended to protrude from the valve body, and it has at the outer end a control means, in such a way as to be open to regulation from the outside.

11. A mechanism as set forth in claim 10, wherein said control means of the member in the shape of a piston is a control knob offered to the maneuver of the user.

12. A mechanism as set forth in claim 10, wherein said control means of the member in the shape of a piston has a suitable shape for being operated by means of a tool.

13. A mechanism as set forth in claim 10, comprising a small cover intended to hide said control means of the member in the shape of a piston and to normally exclude the same from the maneuver of the user.

* * * * *